(12) United States Patent
Di Benedetto et al.

(10) Patent No.: US 11,994,879 B2
(45) Date of Patent: May 28, 2024

(54) LOCATION FOR UNMANNED AERIAL VEHICLE LANDING AND TAKING OFF

(71) Applicant: Drone Delivery Canada Corp., Vaughan (CA)

(72) Inventors: Paul Di Benedetto, Vaughan (CA); Gregory Colacitti, Vaughan (CA)

(73) Assignee: Drone Delivery Canada Corp., Vaughan (CA)

( * ) Notice: Subject to any disclaimer, the term of this patent is extended or adjusted under 35 U.S.C. 154(b) by 16 days.

(21) Appl. No.: 17/983,617

(22) Filed: Nov. 9, 2022

(65) Prior Publication Data

US 2023/0129512 A1   Apr. 27, 2023

Related U.S. Application Data (63) Continuation of application No. 17/491,624, filed on Oct. 1, 2021, now Pat. No. 11,526,178, which is a
(Continued)

(51) Int. Cl.
*G05D 1/00* (2006.01)
*B64C 39/02* (2023.01)

(52) U.S. Cl.
CPC .......... *G05D 1/102* (2013.01); *B64C 39/024* (2013.01); *G05D 1/0027* (2013.01); *G05D 1/0088* (2013.01); *B64U 2201/10* (2023.01)

(58) Field of Classification Search
CPC ..... B64F 1/00; B64F 1/22; B64F 1/32; B64U 2201/10; G05D 1/102; G05D 1/0027; G05D 1/0088
See application file for complete search history.

(56) References Cited

U.S. PATENT DOCUMENTS

| 7,584,071 B2 | 9/2009 | Lee |
| 8,106,748 B2 | 1/2012 | Lee |

(Continued)

FOREIGN PATENT DOCUMENTS

| DE | 102014105583 A1 | 10/2015 |
| DE | 102014213023 A1 | 1/2016 |

(Continued)

OTHER PUBLICATIONS

DRONENET The next BIG thing; Global Guerrillas, Wednesday, Jan. 2, 2013.
(Continued)

*Primary Examiner* — Tye William Abell
(74) *Attorney, Agent, or Firm* — BERESKIN & PARR LLP/S.E.N.C.R.L., s.r.l.

(57) ABSTRACT

A UAV location management method for use with a flight management system is provided, where the method comprises providing a location for at least one unmanned aerial vehicle (UAV) for at least one of: landing, taking-off and loading, providing at least a first weight-sensitive UAV pad at the UAV location, assigning a gross weight limit to each UAV scheduled to take-off from the first weight-sensitive UAV pad, the gross weight limit being based on a safety factor and at least one of: (i) a characteristic of the UAV; (ii) a characteristic of a power source of the UAV; (iii) a scheduled flight path for the UAV; and (iv) a weather condition, monitoring a weight exerted on the first weight-sensitive UAV pad when the UAV is positioned on the UAV pad, and transmitting a halt-flight signal to the flight management system for the UAV where the weight exceeds the gross weight limit.

20 Claims, 7 Drawing Sheets

Related U.S. Application Data continuation of application No. 16/851,685, filed on Apr. 17, 2020, now Pat. No. 11,181,933, which is a continuation-in-part of application No. 15/299,923, filed on Oct. 21, 2016, now Pat. No. 10,625,879.

(60) Provisional application No. 62/355,024, filed on Jun. 27, 2016.

(56) References Cited

U.S. PATENT DOCUMENTS

| | | | |
|---|---|---|---|
| 8,948,935 | B1 | 2/2015 | Peeters et al. |
| 9,051,043 | B1 | 6/2015 | Peeters et al. |
| 9,056,676 | B1 | 6/2015 | Wang |
| 9,120,568 | B2 | 9/2015 | Herman et al. |
| 9,174,733 | B1 | 11/2015 | Burgess et al. |
| 9,211,025 | B1 | 12/2015 | Elhawwashy |
| 9,244,147 | B1 | 1/2016 | Soundararajan et al. |
| 9,302,783 | B2 | 4/2016 | Wang |
| 9,305,280 | B1 | 4/2016 | Berg et al. |
| 9,334,052 | B2 | 5/2016 | Pasko et al. |
| 9,384,668 | B2 | 7/2016 | Raptopoulos et al. |
| 9,387,928 | B1 | 7/2016 | Gentry et al. |
| 9,429,953 | B1 | 8/2016 | Miller et al. |
| 9,527,605 | B1 | 12/2016 | Gentry et al. |
| 9,573,684 | B2 | 2/2017 | Kimchi et al. |
| 9,536,216 | B1 | 3/2017 | Lisso |
| 9,764,836 | B1 * | 9/2017 | Elzinga ................. B64C 39/024 |
| 10,586,464 | B2 | 3/2020 | Dupray et al. |
| 10,625,879 | B2 | 4/2020 | Di Benedetto et al. |
| 2003/0093187 | A1 * | 5/2003 | Walker ............... B64D 45/0059 701/1 |
| 2005/0154653 | A1 | 7/2005 | Jongebloed |
| 2006/0249622 | A1 | 11/2006 | Steele |
| 2011/0063445 | A1 * | 3/2011 | Chew ................... G08G 5/065 348/E7.085 |
| 2011/0264311 | A1 | 10/2011 | Lee et al. |
| 2012/0143482 | A1 | 6/2012 | Goossen et al. |
| 2014/0032034 | A1 | 1/2014 | Raptopoulos et al. |
| 2015/0120094 | A1 * | 4/2015 | Kimchi ................... G05D 1/00 701/3 |
| 2015/0158587 | A1 | 6/2015 | Patrick et al. |
| 2015/0183528 | A1 | 7/2015 | Walsh et al. |
| 2015/0317597 | A1 * | 11/2015 | Shucker ............... G05D 1/0202 235/375 |
| 2015/0332206 | A1 * | 11/2015 | Trew .................. G06Q 10/0836 705/330 |
| 2015/0339933 | A1 | 11/2015 | Batla et al. |
| 2015/0336669 | A1 | 12/2015 | Kantor et al. |
| 2015/0353195 | A1 | 12/2015 | Peeters et al. |
| 2015/0370251 | A1 | 12/2015 | Siegel et al. |
| 2015/0379874 | A1 | 12/2015 | Ubhi et al. |
| 2016/0001883 | A1 | 1/2016 | Sanz et al. |
| 2016/0009413 | A1 | 1/2016 | Lee et al. |
| 2016/0016664 | A1 | 1/2016 | Basuni |
| 2016/0033966 | A1 * | 2/2016 | Farris ................... A47G 29/122 701/16 |
| 2016/0159496 | A1 * | 6/2016 | O'Toole ................. E05B 49/00 244/110 E |
| 2016/0163204 | A1 | 6/2016 | Raptopoulos et al. |
| 2016/0200438 | A1 | 7/2016 | Bokeno et al. |
| 2016/0284221 | A1 | 9/2016 | Hinkle et al. |
| 2017/0069214 | A1 | 3/2017 | Dupray et al. |
| 2017/0073085 | A1 * | 3/2017 | Tremblay ................. B64F 1/12 |
| 2017/0175413 | A1 * | 6/2017 | Curlander ............. B64C 39/024 |
| 2017/0313421 | A1 * | 11/2017 | Gil ........................... H04L 67/55 |
| 2018/0244404 | A1 * | 8/2018 | Park ...................... G06Q 10/083 |
| 2020/0265726 | A1 | 8/2020 | Dupray et al. |

FOREIGN PATENT DOCUMENTS

| | | |
|---|---|---|
| KR | 1020140115024 A | 9/2014 |
| WO | 0218729 A1 | 3/2002 |
| WO | 2015061008 A1 | 4/2015 |
| WO | 2015175242 A1 | 11/2015 |
| WO | 2015168573 A1 | 2/2016 |
| WO | 2016019242 A1 | 2/2016 |
| WO | 2016037219 A1 | 3/2016 |
| WO | 2016059555 A1 | 4/2016 |
| WO | 2016094067 A1 | 6/2016 |

OTHER PUBLICATIONS

International Search and Written Opinion related to corresponding PCT Application No. PCT/CA2017/050777, dated Oct. 3, 2017.

* cited by examiner

LOCATION FOR UNMANNED AERIAL VEHICLE LANDING AND TAKING OFF

RELATED APPLICATION

This application is a Continuation of application Ser. No. 17/491,624 filed Oct. 1, 2021, which is a Continuation of application Ser. No. 16/851,685 filed Apr. 17, 2020, which is a Continuation-in-Part of application Ser. No. 15/299,923 filed Oct. 21, 2016, which claims the benefit of U.S. Provisional Application No. 62/355,024, filed on Jun. 27, 2016, the entire content of these applications is herein incorporated by reference.

FIELD

The present disclosure relates to unmanned aerial vehicles, and locations or facilities for unmanned vehicles.

INTRODUCTION

The following paragraphs are not an admission that anything discussed in them is prior art or part of the knowledge of persons skilled in the art.

Unmanned aerial vehicles (UAVs) have been coming into prominence and have been implemented in limited situations. One obstacle to expanding the uses of UAVs may be public safety. UAVs have also been proposed for delivering of articles, but there is no practical proposal for delivery of articles for customers or users who have little knowledge or familiarity with UAVs.

Know proposals for using UAVs can be found in U.S. Pat. Nos. 9,174,733 and 9,244,147; and U.S. Publication Nos. 201201453482, 20140032034 and 20150120094, the contents of all of which are incorporated by reference.

SUMMARY

The following is intended to introduce the reader to the detailed description that follows and not to define or limit the claimed subject matter.

In accordance with a first aspect of the disclosure, there is provided an unmanned aerial vehicle (UAV) system for operation with a flight management system, comprising:
a plurality of controlled access UAV zones, each being for at least one of: UAV landing, UAV loading, and UAV take-off, that is accessible by a UAV;
a control and communication unit for controlling access to each UAV zone;
for each zone, a barrier around the zone to enclose that zone and to control entry into that zone by users, an opening in the barrier to permit personnel to enter into that zone, a closure for the opening, and at least one remotely operable lock for the closure; and
for each zone, a communications module operable to control the lock for that zone to govern access to and entry into that zone by users;
a flight management system separate from the plurality of zones and in communication with the control and communication unit and with each communications module, and responsive to requests by users to allow access to a selected UAV zone by opening the lock associated with the closure for that UAV zone; and
at least some of the UAV zones are charging zones that include at least one charging cable for charging a battery of a UAV.

The unmanned aerial vehicle (UAV) system may include a control and communication unit for each UAV zone, providing control of the lock for the closure for that UAV zone and in communication with the flight management system.

Each charging zone and the control and communication unit therefor may be controlled by the flight management system, to control and to monitor charging of a UAV.

Each charging zone may include at least one charging cable for charging and avionics battery of a UAV and another charging cable for charging a propulsion battery of a UAV, and each charging cable may include a connector for connecting to a UAV.

The charging cables may be provided with connectors enabling automatic connection to a UAV without manual input.

For each charging zone, the control and communication unit therefor may be adapted to receive data from a UAV indicating charging parameters for the batteries of the UAV, optionally including current and voltage.

The unmanned aerial vehicle (UAV) system may include at least one UAV zone provided with at least medical supplies for transportation by UAV, each UAV zone with medical supplies comprising a medical supply location.

Each medical supply location may include a connection between the flight management system and the medical supplies, for monitoring the status of the medical supplies.

Each medical supply location may include a UAV, with the medical supplies attached to the UAV, for transportation and delivery of the medical supplies.

Each medical supply location may include at least one charging cable connected to the UAV, for maintaining UAV batteries in a charged condition, and wherein the flight management system is in communication with the UAV to monitor the charge state of the UAV.

A connection between said at least one charging cable and the UAV, may permit the UAV to disengage from the charging cable and apart from the medical supply location, without manual intervention.

The unmanned aerial vehicle (UAV) system may include a housing with a closure, housing and protecting the UAV and the medical supplies, the closure being openable by the flight management system, to permit the UAV with the medical supplies to depart from the medical supply location.

The medical supply locations may be selected and spaced within the UAV zones, to ensure that all points within a selected geographic area can be reached by a UAV with medical supplies from at least one of the medical supply locations. At least some of the medical supply locations may be provided at one of a hospital, doctors' offices and other medical facilities.

Another aspect of the present disclosure provides a method of managing a plurality of unmanned aerial vehicle (UAV) landing and take-off locations, at least some of the locations being spaced apart whereby one location can serve as a departure location and another location can serve as a destination location, the method comprising the steps of:
providing, for each location, an enclosure defined by a barrier to personnel, the enclosure including at least one zone for landing and take-off of a UAV and accessible by a UAV;
providing, for each location, an opening in the barrier to permit personnel to enter the enclosure and a closure for closing the opening;
providing, for each location, a remotely actuatable lock for the closure; and actuating the lock for each location, to permit opening of the closure thereof, thereby to enable users to enter that enclosure.

The method may include providing, for each location, a control and communications unit a connected to the lock for that location, and requiring a user to input an access code to the control and communications unit for that location to open that lock.

The method may include enabling a user to enter an access code through a user electronic device.

The method may include providing an input device on the exterior of the location, requiring a user to input at least one of a username and a password to the input device, and further providing for user to acknowledge a communication to a user electronic device, to provide for two factor authentication.

The method may include providing for different levels of access, including controlling access to each location with a flight management system, only enabling access to public users when the flight management system determines that the location is clear and unobstructed and the user has the right to access a UAV at that location.

The method may include providing access to operators of a location, to enable maintenance and cleanup of any obstructions The method may include providing differential charging for access to the location, the differential charging including at least one of: charging different amounts for access at different times; varying charges depending upon the demand for access to the location; and providing different charging for exclusive access to a location.

The method may include providing at least one location with medical supplies, for delivery by a UAV, as a medical supply location and permitting access to each medical supply location only to selected, medically qualified users.

The method may include providing a UAV at each medical supply location, providing the charging of that UAV, monitoring the state of charge of the UAV, and only deploying the UAV with the medical supplies when the UAV is adequately charged.

The method may include providing charging for UAVs at a location, monitoring the charge of a UAV is location, and charging for the charging services.

BRIEF DESCRIPTION OF THE FIGURES

For a better understanding of the described embodiments and to show more clearly how they may be carried into effect, reference will now be made, by way of example, to the accompanying drawings in which.

DETAILED DESCRIPTION

Various systems, apparatuses or methods will be described below to provide an example of an embodiment of each claimed invention. No embodiment described below limits any claimed invention and any claimed invention may cover apparatuses and methods that differ from those described below. The claimed inventions are not limited to systems, apparatuses and methods having all of the features of any one apparatus or method described below, or to features common to multiple or all of the systems, apparatuses or methods described below. It is possible that a system, apparatus or method described below is not an embodiment of any claimed invention. Any invention disclosed in a system, apparatus or method described below that is not claimed in this document may be the subject matter of another protective instrument, for example, a continuing patent application, and the applicant(s), inventor(s) and/or owner(s) do not intend to abandon, disclaim or dedicate to the public any such invention by its disclosure in this document.

Various embodiments of a location 100 for unmanned aerial vehicle (UAV) 102 landing and taking off are described below.

Figure 1:
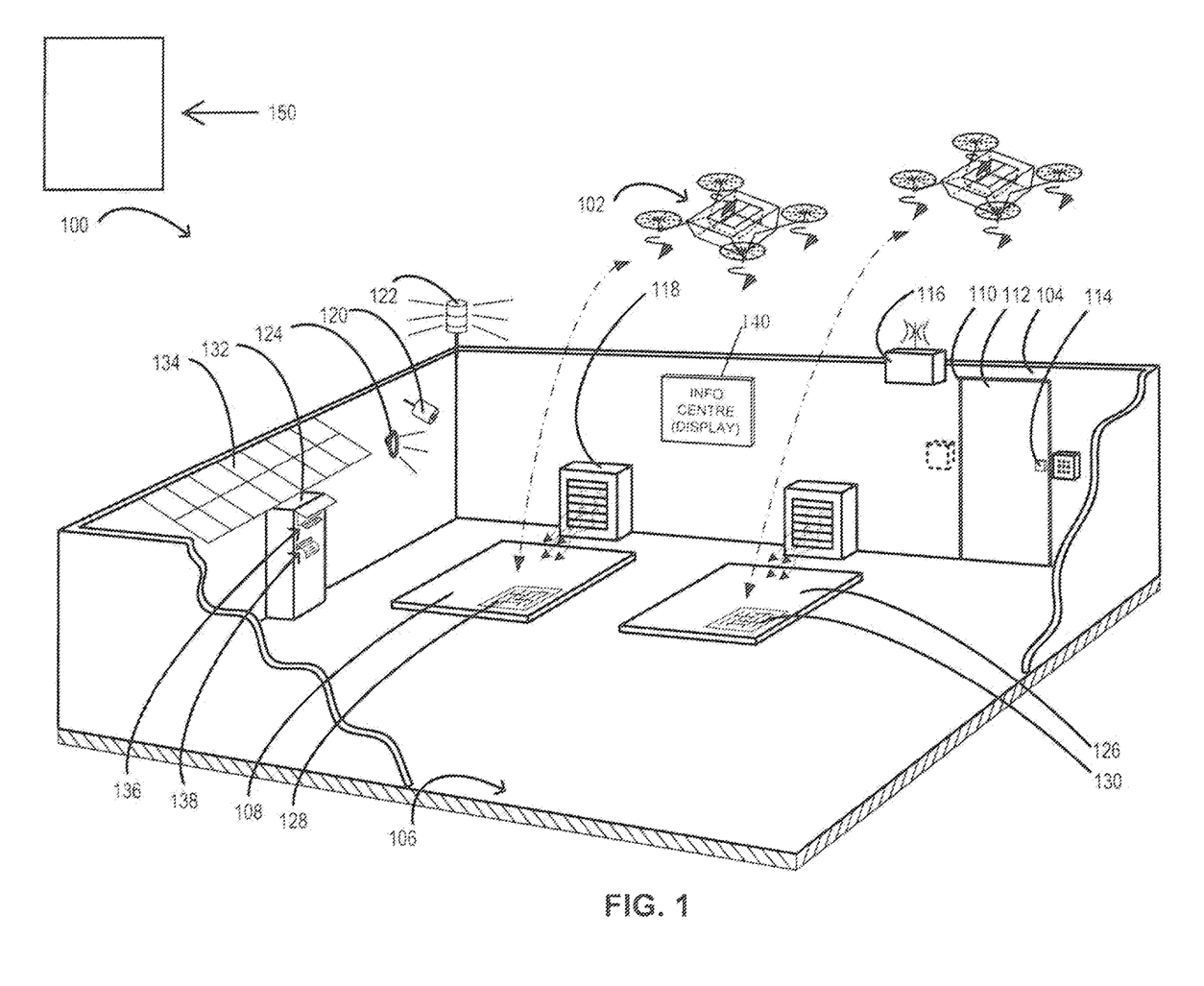
FIG. 1 is a schematic of an example location for unmanned aerial vehicle (UAV) landing and taking off, according to one embodiment.

Reference is now made to FIG. 1, which shows an example location for a UAV 102 landing and taking off. The location 100 has an enclosure 106, a barrier 104 around the enclosure 106, at least one of a landing zone 108, 126 and a take-off zone 108, 126 in the enclosure 106, an opening 110 in the barrier 104, a closure 112 for the opening 110, a control panel 116, a flight management system 150, and at least one remotely operable lock 114 for the enclosure 106. The control panel 116 may be operable to provide for restricting access and granting access to the location 100. As shown, the lock 114 may be connected to at least one of the control panel 116 and the flight management system 150, e.g. wirelessly. In one example, the closure 112 may be provided as a gate 112 operable to selectively provide and restrict ground access to the location 100 via the opening 110.

While a control panel 116 is shown separately from the lock 114, they could be combined in one device. Where there are a plurality of locks, each could have the necessary functionality of the control panel to communicate with the flight management system, or one lock could be a 'master lock' with this functionality, and other locks could be 'slave locks' controlled by the master lock. In this case, a separate communication device(s) can be provided for communications with user, which can include a touchscreen, visual indication of status of locks, etc.

Each of the zones 108, 126 may be identified as being for only one of landing and taking off, or may be designated for both landing and taking off. For a zone designated or used only for taking off an identifier may not be so critical, but is preferred as it enables the UAV to read the identifier and ensure it is departing from the correct location.

The barrier 104 and the gate or closure 112 can be provided in the form of a wire mesh fence with a gate also formed of wire mesh on a frame, for example. The height of the barrier 104 and fence 112 can be in the range of 6 to 8 feet (or approx. 1.85 to 2.45 metres). The barrier may alternatively be in the form of a wall. Additionally, while the location 100 is shown with a vertical enclosure open at the top, for UAVs to enter and exit vertically, other configurations are possible, particularly for winged UAVs that require horizontal landing and take-off facilities. The location 100 could be provided with a covering or roof partially or completely covering the location 100. At least for a full cover over the location 100, part of the cover will be movable to open the location to access by UAVs. The use of a cover or roof may have advantages in climates subject to snow or other precipitation harmful to UAVs. Further, as even rotor powered UAVs can land and take-off essentially horizontally, the location 100 may have a complete and fixed roof or cover, with the UAVs entering and leaving the zone from one side. (Although, for rotor driven UAVs, the immediate motion on arriving and leaving a landing or take-off zone may be vertical, this need only be for a small distance.) In this case an open side may include doors or gates to close off the location 100. This may particularly applicable, when the location can be provided on top of a building. In this case the open side of the location 100 may be provided continuous with a side wall of the building, so that even when open, it does not provide an access opening to unauthorized personnel.

In one aspect, the control panel 116 may be operable to store an access code for the location 100, and to receive updates to the access code from the flight management system 150. In another aspect, the control panel 116 may be operable to store additional access codes for the location 100. For example, additional access codes may be programmable into the control panel 116 via at least one of an input-output device connected to the control panel 116 The control panel may be configured for communication with user handheld or mobile devices, such as smartphones and tablet computers, and for this purpose user handheld devices may have a mobile app adapted to communicate with the control panel 116 and/or the lock 114. The control panel 116 may provide the same functions as the control and communications unit described below.

At least one of the control panel 116 and the flight management system 150 may be operable to assign various access levels to the additional access codes. In some examples, the access levels may include restrictions on access times, times of day during which a given code may be used, and locations 100 to which the codes may grant access. In other examples, the access levels may also include one or more safety interlocks with various conditions for a given location 100. For example, a particular access code may be programmed to provide ground access to the location 100 irrespective of whether a condition (such as, for example, an obstruction) at the location 100, which condition may suspend other access codes, exists. Such an access code would be assigned to a person in a supervisory role, responsible for the maintenance of the location 100.

In another aspect, the location 100 may include a first sensor operable to detect an obstruction within the location. The control panel 116 may be operable to restrict access to the location upon detection of an obstruction to the location by the first sensor. In one example, the first sensor may include a video sensor 120 or a video surveillance apparatus 120. In another example, the first sensor may include a video sensor 120 operable with at least one processor executing instructions stored on a non-transitory memory to detect an obstruction. In yet other examples, the location 100 may include a second sensor operable with the first sensor to detect an obstruction. In one example, the second sensor may include an infrared sensor. In a particular example, the first sensor may be operable to detect a quantity of obstructions, and the second sensor may be operable to detect, for each obstruction, a type of the obstruction. Other possible sensors are thermal sensors and photo-electric sensors, where interruption of a laser beam on light beam indicates the presence of an unwanted object.

In some embodiments, the first sensor may be operable with at least one processor to detect at least one of an animate object and an inanimate object. In some embodiments, the first sensor may be operable with the second sensor to detect at least one of an animate object and an inanimate object. Such objects may be obstructions to the location 100 in that they may pose a risk to UAV 102 landings and take-offs, depending on the nature of the object(s). The control panel 116 may be operable with the flight management system 150 to halt all UAV landings and take-offs to and from the location 100 upon the detection of an obstruction. Examples of inanimate objects that may be obstructions may include: leaves, tree branches, and articles of garbage which may be, for example, blown into a given location 100 by a wind. Examples of animate objects that may be obstructions may include: persons and animals.

In one example, the control panel 116 may be operable to determine the obstruction to be one of: at least one animate object, at least one inanimate object, and at least one animate object in combination with at least one inanimate object. In other examples, at least one of the control panel 116 and the flight management system 150 may be operable to perform the determination. For example, the control panel 116 may be operable with the first sensor to distinguish between animate and inanimate projects, and in at least some embodiments to also distinguish whether the one type, the other type, or both types of objects are present within the location 100.

Obstructions such as animate and inanimate objects may pose a risk to UAV 102 landings and take-offs. UAV 102 landings and take-offs may pose a risk, such as a risk of injury or death, to the animate objects. In some examples, animate objects may be removed from the location 100 by providing, for example, at least one of an audio 124 and a visual 122 signal to the animate objects. In one example, a given color of light signal may be provided along with, for example, a buzzer. In one example, the light signal may be provided by at least one light source 122. The at least one light source 122 may be mounted on, for example, the enclosure 106. In other examples, a siren 124 may be provided to generate a sound at the location 100. In an aspect, a siren 124 may be operable to scare off animals from the location 100.

To discourage animals, and insects from entering or staying in the location, the location can be provided with a high frequency sound source, at a frequency that is inaudible to humans. This can be run continuously, or before and during a UAV take-off and landing, as required.

In some embodiments, the location 100 may include a cleaner 118 operable to remove at least inanimate objects from the location 100. Depending on the embodiment of the cleaner 118 selected for a particular embodiment of the location 100, it may be safe to operate the cleaner 118 even when an animate object is present within the location 100. One such example cleaner 118 may include an automated vacuum robot movable within the location 100 and equipped with collision and location sensors operable to allow the robot to avoid collisions and to operate within the location 100. In some cases, the cleaner 118 may be programmable to operate in designated parts of the location 100.

The parts may be designated by, for example, at least one combination of an infrared light source and a corresponding infrared sensor. The infrared light and sensor combination may be operable with at least the control panel to detect when the cleaner 118 interrupts a line of "sight" between the source and sensor, and in response send a signal to the cleaner 118 to change at least one operating characteristic of the cleaner 118. In one example, the characteristic may include a direction of motion of the cleaner 118.

A suitable cleaner 118 may be selected based on a given embodiment of the location 100. The cleaner 118 may be selected to be suitable for removing the types of obstructions that may be expected to occur at the given location 100. In one example, the cleaner 118 may be an air blower 118 disposed within the location 100. The blower 118 may be operable to generate and direct an air stream to the location 100 to remove at least one type of obstruction from the location 100.

Depending on the features of a given embodiment of the location 100 and the at least one UAV 102 used with the location 100, operating the cleaner 118 may pose a risk to at least one of the at least one UAV 102 and animate objects that may be present within the location 100 at various times. In other examples, operating the cleaner 118 may cause discomfort to the animate objects. Accordingly, the control panel 116 may be operable to start the cleaner 118 when the location 100 is free from UAV 102 landings and take-offs and the obstruction is determined to be at least one inanimate object In another aspect, the control panel 116 may be operable to: a) provide at least one warning signal, such as for example described above, when at least one animate obstruction and at least one inanimate obstruction is detected; b) monitor the animate obstruction; and c) start the cleaner 118 after the control panel receives an indication (for example, a signal) that the location 100 is free from animate obstructions and contains at least one inanimate obstruction. In yet other examples, the control panel 116 may be operable to generate a signal to halt all UAV landings and take-offs scheduled for the location 100, then start the cleaner 118, and then generate a signal to resume UAV landings and take-offs once it is determined that the location 100 is free from obstructions.

Depending on the use of a given embodiment of the location 100, it may be desirable to record at least one form of proof of UAV 102 landings and take-offs. In more particular examples, it may be desirable to record at least one form of proof of safe UAV 102 landings and take-offs. In some examples, the location 100 may include at least one sensor operable with at least one of a computing system and a processor to detect at least one of an approach, landing, and take-off of the at least one UAV 102 and to record a video of the at least one approach, landing, and take-off.

A UAV location management method for use with a flight management system is described next. In another aspect, a method of managing an unmanned aerial vehicle (UAV) landing and take-off location is also described.

The method may include providing a location 100 for at least one of UAV 102 landing and taking off, providing a cleaner 118 for the location 100, and by using at least one computing system: a) monitoring for at least one obstruction to the location 100; and b) determining the at least one obstruction as being one of: at least one animate object, at least one inanimate object, and at least one animate object in combination with at least one inanimate object.

The method may further include, when the obstruction is determined to be at least one inanimate object, performing at least one of: a) restricting access to the location 100; b) transmitting an instruction to the flight management system 150 to halt UAV 102 flights and take-offs to and from the location 100; and c) transmitting an instruction to the cleaner 118 to remove the inanimate object from the location 100.

In another aspect, the method may also include providing at least one of an audible 124 and a visual 122 notification at the location 100 when an obstruction is detected. In another aspect, the method may also include providing at least one of an audio 122 and visual 124 notification of each UAV 102 landing and take-off.

Additionally both before and during landing and take-off, the audible and visual notification devices 122, 124 can be operated to deter animals, etc. Also, as a standard part of any UAV landing or take-off, blowers and other cleaning devices can be operate before the landing or take-off.

Figure 4:
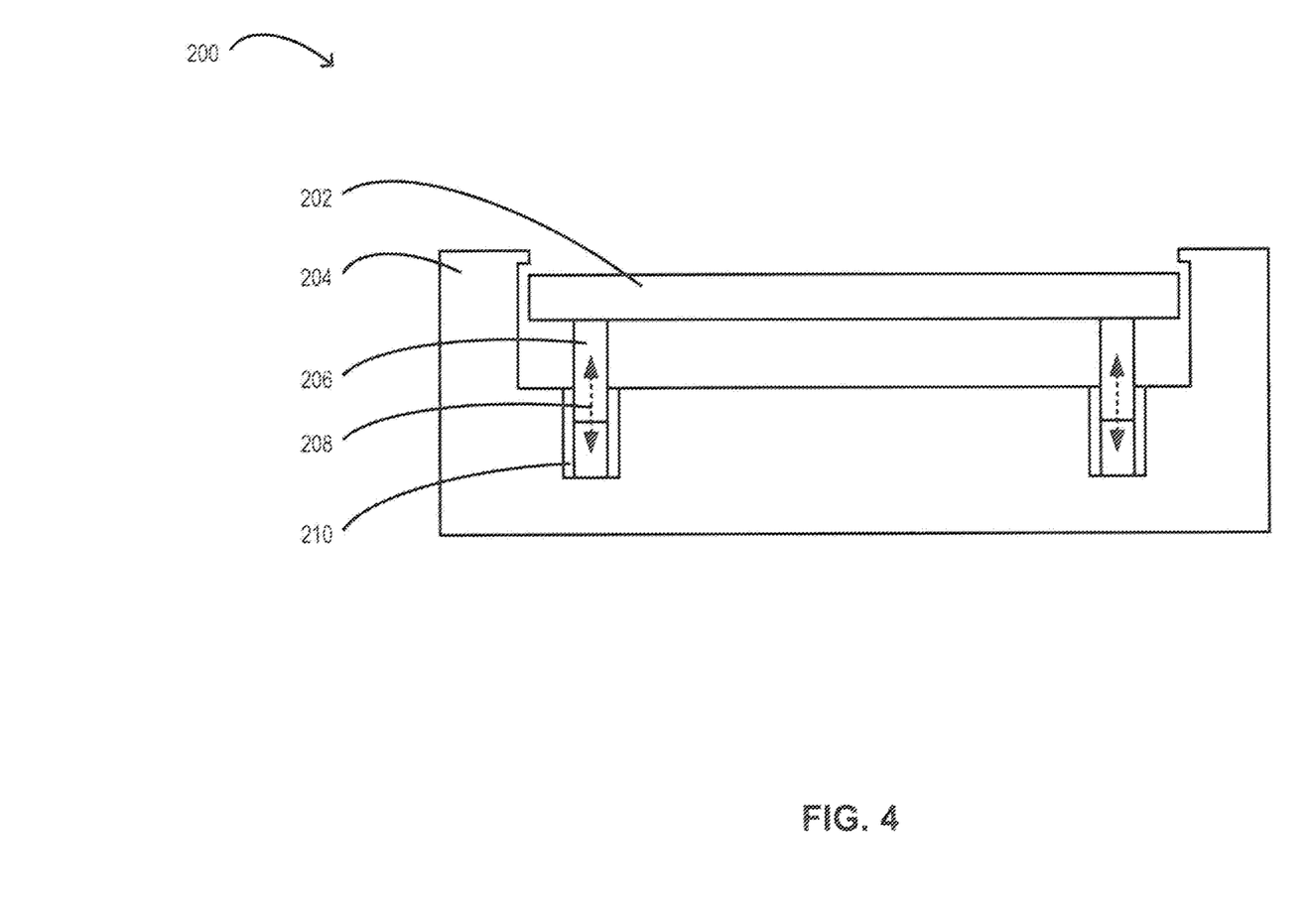
FIG. 4 is a schematic side section view of an example UAV pad, according to one embodiment.

In another aspect, the method, as shown in FIG. 4, may also include: providing at least a first weight-sensitive UAV pad 200 for each of the zones 108, 126 for at least UAV 102 take-offs; and by using at least one computing system: 1) assigning a gross weight limit to each UAV 102 scheduled to take-off from the UAV pad 200, the limit being based on a safety factor and at least one of: a) a characteristic of the UAV 102, b) a characteristic of a power source of the UAV 102, c) a scheduled flight path for the UAV 102, d) and a weather condition; 2) monitoring a weight exerted on the UAV pad 200 when the UAV 102 is positioned on the UAV pad 200; and 3) transmitting a halt-flight signal to the flight management system 150 for the UAV 102 where the weight exceeds the limit.

The location 100 can also include a computer portal or monitor 132 and/or a display 140. The monitor 132 can include an input keyboard and display 136, which can be combined as a touchscreen. It can additionally include a printer 138, for printing various documents. For example, the printer could be used to print a label for adhering to an article to be delivered, with the label bearing a barcode or other machine-readable code. The code can then be scanned or read at various locations, to track delivery of an article. Various electrically powered devices at the location 100, including the monitor 132 can be connected to a conventional electrical supply and/or to a solar panel 134. Where the solar panel is provided, backup battery capacity can be provided.

Reference is now briefly made to FIG. 4. In a particular example, the weight-sensitive UAV pad 200 may comprise a pad body 204 and a level pad 202 slidable up 208 and down 208 relative to the body 204. The body 204 may include at least one weight sensor 210 in communication with at least one of the control panel 116 (FIG. 1) and a processor. The level pad 202 may be sized to accommodate for at least one of a landing and a take-off of the at least one UAV 102.

In yet another aspect, the method may also include providing a first UAV-readable identifier 128 for the first UAV pad 200, the identifier 128 identifying at least one of: a location 100 of the UAV pad 200, and an identity of the UAV pad 200. In yet another aspect, the method may also include providing at least a second UAV pad 200 for at least UAV 102 take-offs, and providing a second UAV-readable identifier 130 for the second UAV pad 200. In some examples, the second identifier 130 may be UAV-distinguishable from the first identifier 128. More than two UAV zones, for landing and taking off, can be provided, as required.

Each identifier optionally can include a logo, trademark or other indicia indicative of an operator of the system. Alternatively or as well, each identifier could include a logo, trademark or other indicia of a person, business or organization associated with or managing a particular location.

Thus, if a location is provided at a business or shopping mall, that business or shopping mall may want to incorporate their name, logo, etc. into the identifier 128, 130.

In some examples, at least one of the identifiers 128, 130 may include at least one mark that may be distinguishable, and in some cases readable, by a UAV 102. For example, a UAV 102 may include a sensor operable with a processor to distinguish, and in some cases read, the mark. In a particular example, the mark may include a matrix barcode 128, 130, such as a Quick Response Code™. In a particular example, the UAV 102 may include a video sensor in communication with a processor, and the video sensor may be operable with the processor to capture images of the ground in a vicinity of the UAV 102 and monitor the images for the presence of the mark. Upon detecting the mark, the processor may interpret, for example, particular geometrical features of the mark to generate information pertaining to the mark and UAV zone 108, 126. In some cases, the processor may execute instructions stored on a non-transient memory in order to refine the images using, for example, Reed-Solomon error correction, until the processor can interpret the images. The identifiers 128, 130 may also include beacons that transmit a signal that can be identified by a UAV and used to home in on the desired UAV zone 108, 126.

In another aspect, the method may also include, by using at least one computing system: providing a video feed showing the location 100; and at least when an obstruction in the location 100 is detected, rendering the feed available on at least one channel to be accessed by at least one of: a) an operator of the flight management system 150, and b) an operator of the location 100. The method may further include providing at least one channel for receiving, from at least one of the operators, an override to at least one of the steps of: a) restricting access to the location 100, and b) transmitting an instruction to the flight management system 150 to halt all UAV 102 flights and take-offs to and from the location 100.

In yet another aspect, the method may also include, by using at least one computing system: controlling ground access to the location 100 by requiring a user to enter a ground access code, upon receiving a request from the user for ground access; having the flight management system 150 send the user an access code, that many be sent to a user handheld device; having the user enter the access code at the control panel 116; denying the ground access where the ground access code is incorrect; and granting the ground access when the correct access code is entered.

In examples where the location 100 includes an opening 110 and a gate 112 for the opening being selectively lockable and unlockable via a lock 114, the granting of ground access may include unlocking the lock 114 and denying the ground access may include locking the lock 114.

In yet another aspect, the method may also include providing at least one of an internet connection, a cellular connection, a satellite connection, a private RF connection, a wired connection and a wireless connection for the flight management system 150 to access the at least one channel and communicate with the control panel 116. The flight management system 150 may be operable to control the at least one UAV 102 during at least one of: take-off from and landing to a given embodiment of the location 100, and in transit operation. In some examples, the control panel 116 may be operable with the flight management system 150 to control the at least one UAV 102 during at least one of: take-off from and landing to the location 100. In yet other examples, the control panel 116 may be operable to provide back-up control of the at least one UAV 102 in the case of failure of the flight management system 150.

For example, the control panel 116 may be operable to receive flight management system 150 status updates from the flight management system 150 at pre-programmed intervals. The control panel 116 may be operable to transmit a control-takeover signal to the at least one UAV 102 in response to receiving no (i.e. failing to receive) status updates from the flight management system 150 during a pre-set period of time. In other examples, the control panel 116 may be operable with the flight management system 150 to track the status of the at least one UAV as at least one of: scheduled to land, landing, scheduled to take-off, taking off, and in transit. The control panel 116 may be configured to be capable of sending the control-takeover signal when the status of the at least one UAV is one of: scheduled to land, landing, scheduled to take-off, and taking off.

Additionally, the method may comprise the following steps, at a departure location 100, selected for a requested delivery:

(i) after receiving a request for delivery of an article, at either the control panel 116 or the flight management system 150, generating a departure access code for a location 100 that is a departure location for the requested delivery;

(ii) transmitting the access code to one or more persons associated with the delivery request, who are senders of the article (as part of the delivery request or order, a customer may be asked for contact information for one or more senders at the departure location and one or more receivers at the destination location, for transmission of access codes);

(iii) the access codes may be transmitted wirelessly or otherwise, to each senders portable device such as a smart phone, tablet computer and the like and to the control panel 116 at the departure location;

(iv) a sender with the access code will approach the departure location 100, but will not be permitted access until a UAV selected for the delivery is present at the departure location 100; in some cases a required UAV may already be present and waiting, while in others there will be some delay until a UAV can be sent and arrives from some other location;

(v) once the UAV 102 is present at the departure location 100 (and optionally in the case of a recently arrived UAV, after providing time for rotors to come to rest), the flight management system 150 checks the departure location 100 using available sensors and/or visually checking the location using the surveillance apparatus 120, which may be done either by a computer generated check for unauthorized movement or presence of unauthorized objects, or by an operator examining images of the departure location 100; once it is confirmed that there are no obstructions at the departure location 100, the flight management system 150 will transmit to the control panel 116 a signal permitting the lock 114 to be opened; optionally, a visual indication can be provided by the control panel 116, e.g. on a screen and/or a signal sent to each sender having the access code for the departure location 100 that the location is now available for access;

(vi) a sender can then enter the departure access code, which may be either by way of a keypad at the departure location 100 or by transmitting the access code using suitable short range wireless transmission from a handheld device, such as Bluetooth™, which necessarily will require an individual to be present;

(vii) on receipt of the access code, the control panel 116 will open the lock 114, and the sender can then enter the departure location 100;
(viii) as required, the printer 138 can be used as detailed above to print a label for an article to be delivered and the sender will then attach the label to the article;
(ix) the sender will then approach the UAV and secure the article to the UAV as a payload for delivery; this may comprise the sender opening a compartment in the UAV placing the article in the compartment and closing the compartment, e.g. by an unlatching an latching operation; the UAV will have sensors to detect opening and closing of the article compartment, which will be transmitted to the control panel 116 and to the flight management system 150;
(x) the sender may be required to carry out a series of checks and indicate that each of these has been carried out, e.g. by checking boxes in a list or a screen of the control panel 116 or on a user's handheld device; these checks can include: is area clear; has a visual inspection been completed; is UAV intact and undamaged including check that all rotors are present, secured and with no obvious damage;
(xi) the sender will then exit the departure location, which may require reentering of the departure access code to open the gate 112; optionally if the sender does not exit within a prescribed time period, a communication can be sent to the sender's handheld device to remind him/her to exit;
(xii) as earlier, sensors at the departure location 100 including the video sensor or surveillance apparatus 120 may then be used to confirm that the sender has exited the location 100; the lock 114 will then be closed and will not permit the sender to reopen the lock 114, even if the access code is entered again;
(xiii) the flight management system 150 may then run required pre-flight checks on the UAV 102 including, for example, checking the weight of the UAV with the article, checking on the available battery life for the UAV, and a final check on weather along the route for the delivery; and
(xiv) if the checks are all clear, the UAV will then be instructed by the flight management system 150 to commence the delivery; at this time, optionally, a communication can be sent to all parties involved in the delivery (again as detailed by the person requesting delivery) that the delivery has commenced, which will usually include a sender at the departure location and a receiver at the destination location, and this may include an anticipated arrival time.

Correspondingly, at a destination location 100 (it will be understood that the departure and destination locations will be separate, but the same reference numeral is used for both, as both of them will have similar elements as shown in the Figures and as described), the method can include the flight management system generating a destination access code that will be transmitted to the person requesting the delivery, and which may be the same as or different from the departure access code. The method at the destination location can include the following additional steps:
(i) as detailed elsewhere, the UAV 102 will be permitted to land at the location, once it is confirmed that the closure 112 is closed and locked and that there are no obstructions present; as for the departure sequence, a receiver may be required to enter the location and to perform and to confirm visual checks;
(ii) as for the departure sequence, a destination access code will be sent to each receiver that has been identified to the flight management system 150 and to the control panel 116 at the destination location;
(iii) after the UAV 102 has landed at the destination location 100 and, optionally, after allowing a suitable period of time for the rotors of the UAV to come to rest, the control panel 116 and/or the flight management system 150 will send a signal to the lock 114, to permit it to be opened by the destination access code;
(iv) the receiver will then enter the destination access code at the destination location 100; as for the departure location, this may be done either by entering the access code on a local keypad, or by way of short range wireless communication, e.g. Bluetooth™, from a handheld device or the like;
(v) with the destination access code entered, the lock 114 is opened, and the receiver may open the gate or closure 112, to gain access to the destination location 100;
(vi) optionally, to ensure all necessary actions are completed, the lock 114 may then be closed, and may only be opened once the receiver has completed required actions to retrieve an article etc.; this option may include the provision of an emergency release of the lock 114, in case of some failure or breakdown that prevents a receiver from completing the required actions;
(vii) the receiver will then approach the UAV 102, open a compartment for the article, e.g. by releasing a latch, or otherwise detach the article from the UAV 102, and where necessary close a compartment;
(viii) the receiver may then send a signal, e.g. by reentering the access code, or entering a different code provided, to the control panel 116 which will communicate with the flight management system 150, to indicate that the article has been retrieved;
(ix) the flight management system 150 will then check that the article has been retrieved, by confirming that the measured weight of the UAV, as measured by the UAV pad 200, has been reduced by the weight of the article, and will also confirm that any required actions such as relatching or closing a compartment have been completed;
(x) once the flight management system 150 has confirmed these actions, i.e. retrieval of the article and closure of a compartment on the UAV, the lock 114 is then again released;
(xi) the receiver can then reenter the local destination access code, to open the lock 114, so the receiver may exit the departure location 100 bearing the article; when the receiver closes the closure or gate 112, the lock 114 secures the closure 112; at this time, the receiver's destination access code may then be rendered inoperative, to prevent any reentry by the receiver into the location 100, and optionally, this may only be after the receiver has sent a communication to the flight management system 150 confirming that receipt of the article is complete and/or after a predetermined period of time after the receiver has exited the destination location.

Figure 2:
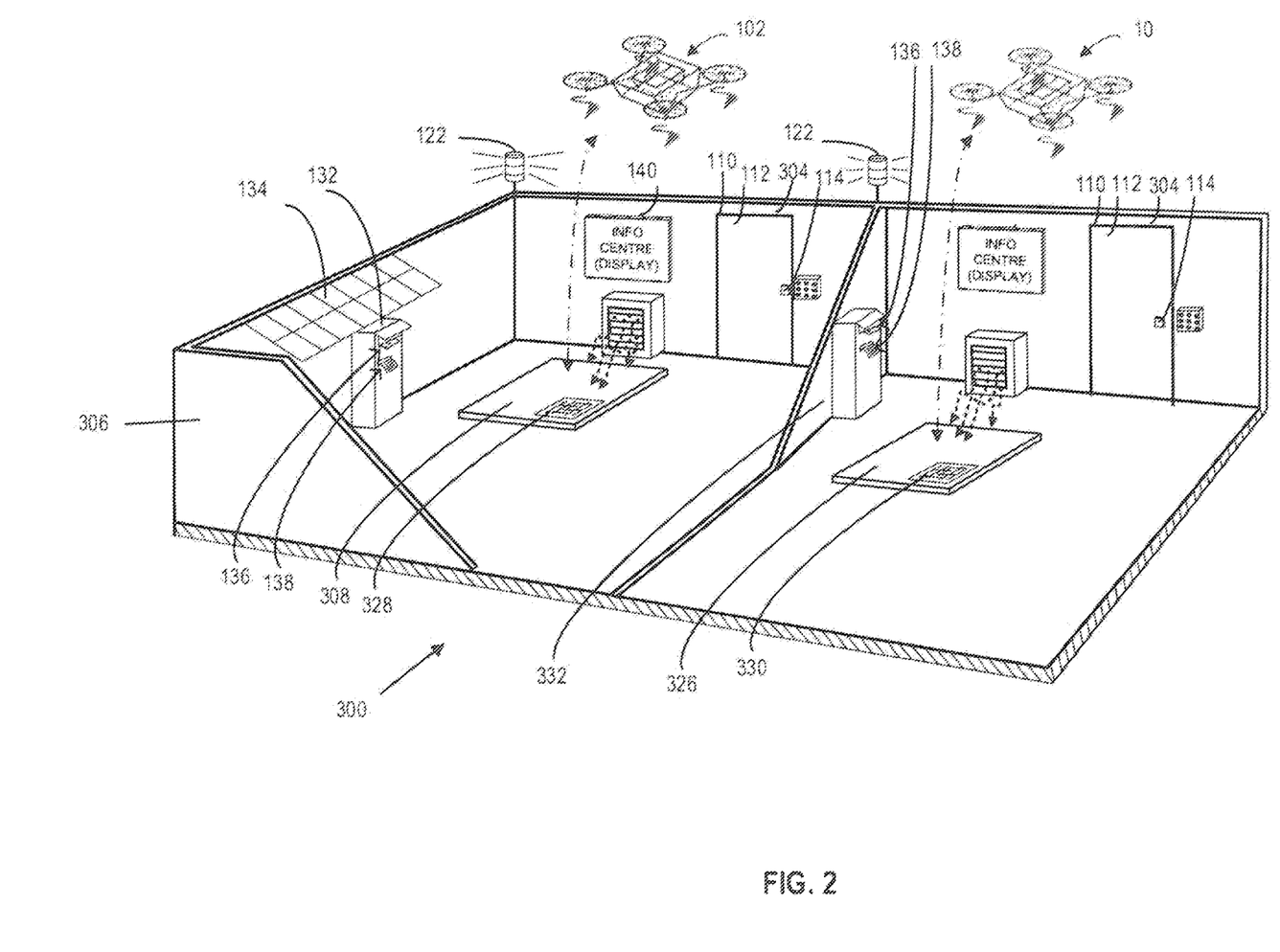
FIGS. 2 and 3 are schematic examples of other embodiments of a location for UAV landing and taking off.
Figure 3:
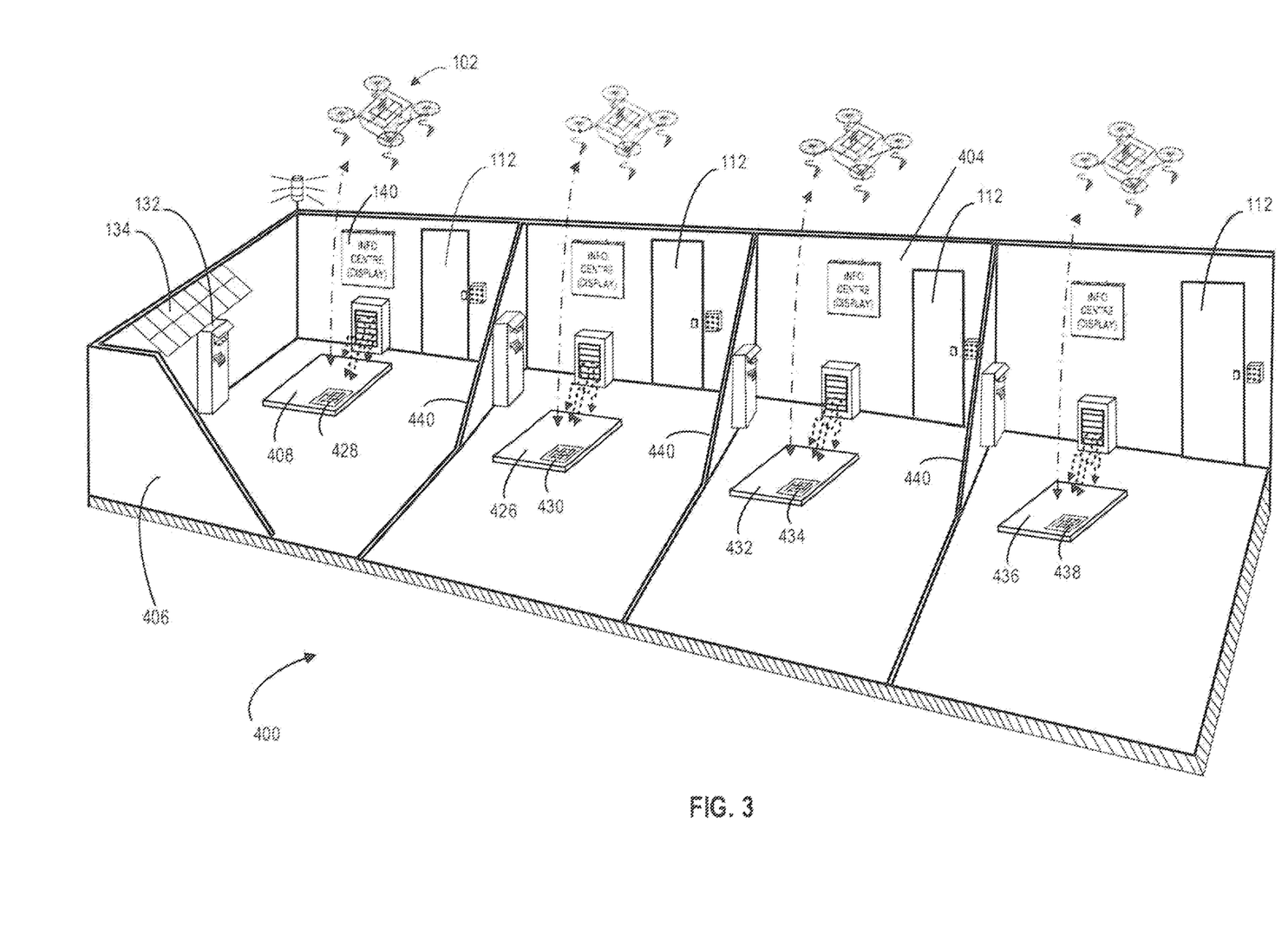

Reference will now be made to FIGS. 2 and 3 which show alternative locations that include, respectively, two and four individual and separate zones. For simplicity and brevity, like components in FIGS. 2 and 3 are given the same reference numeral as in FIG. 1, and it will be understood that in general the individual components of the location shown in FIG. 1 will be duplicated for each of the zones shown in FIGS. 2 and 3.

Thus, in FIG. 2, a location 300 has an enclosure 306 with a barrier 304, which includes an additional dividing wall 332. This provides for a first zone 308 with an identifier 328 for landing and taking off, and a second zone 326 with an identifier 330 for landing and taking off, each of which can be accessed separately through a respective closure or gate 112, to ensure that, for each zone, only authorized personnel are given access.

Similarly in FIG. 3, a barrier 404 is divided by walls 440 into four separate zones 408, 426, 432 and 436, with respective identifiers 428, 430, 434 and 438. Each zone is provided with its own access closure or gate 112. (It will be understood that in order to show details of each zone, in FIGS. 1, 2 and 3, barrier and dividing walls are shown cutaway.)

Figure 5:
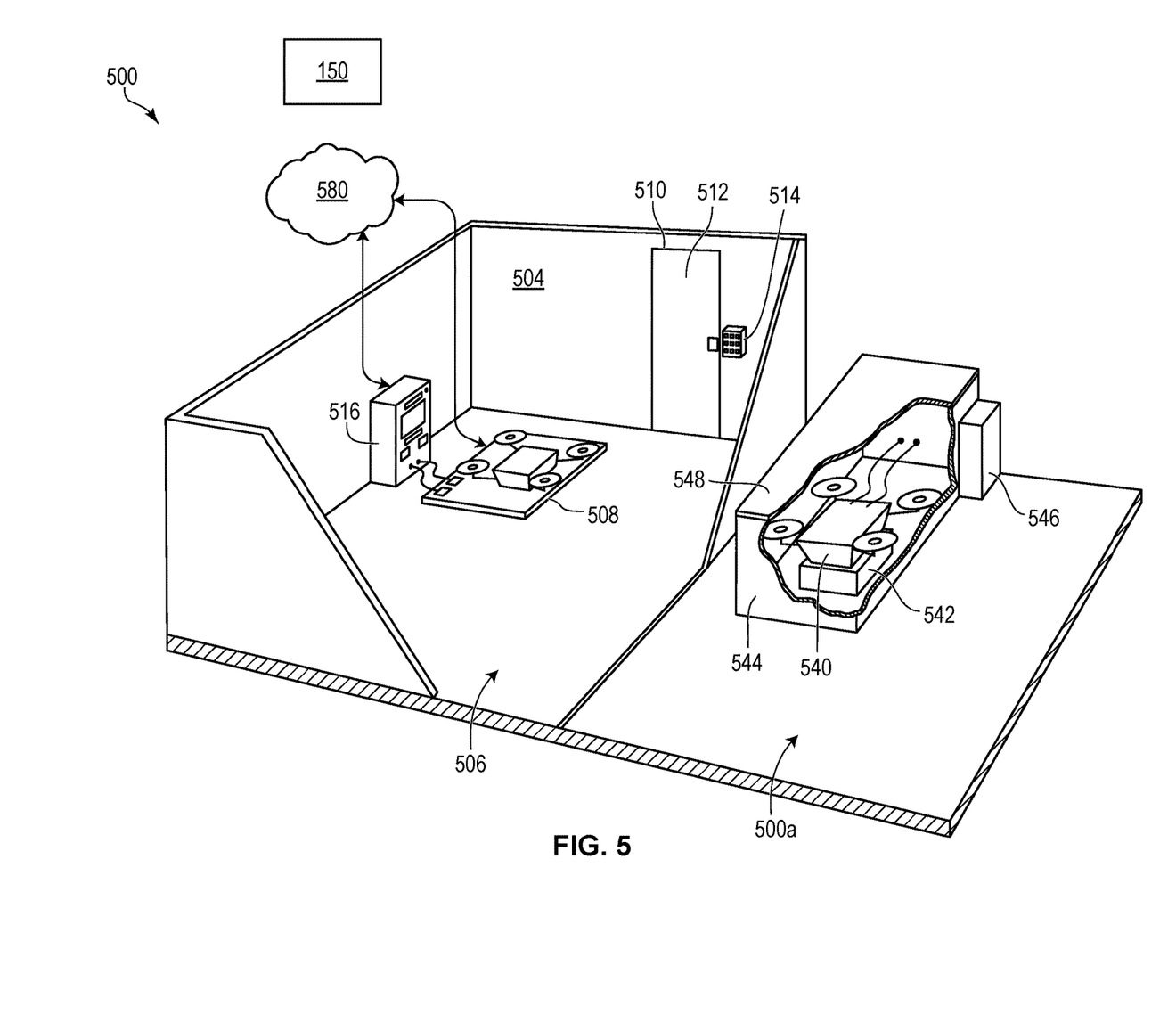
FIG. 5 is a schematic of an example location for unmanned aerial vehicle (UAV) landing and taking off, according to a further embodiment, including provision for charging UAVs and storage of medical supplies and/or a UAV for delivery of the medical supplies.

Reference will now be made to FIG. 5 which shows a further embodiment of a controlled access UAV zone. As for other UAV zones locations, it will be understood that the features of this zone can be provided singularly, or in a complex including a plurality of zones, with features different between the zones as required.

Similarly to other embodiments, a location 500 has an enclosure 506, a barrier 504 around the enclosure, and a landing and takeoff zone 508. As for other embodiments, it will be understood that the enclosure 506 is shown cutaway. An opening 510 in the barrier 504 is closed by a door or other closure 512, secured by a remotely operable lock 514.

Figure 6:
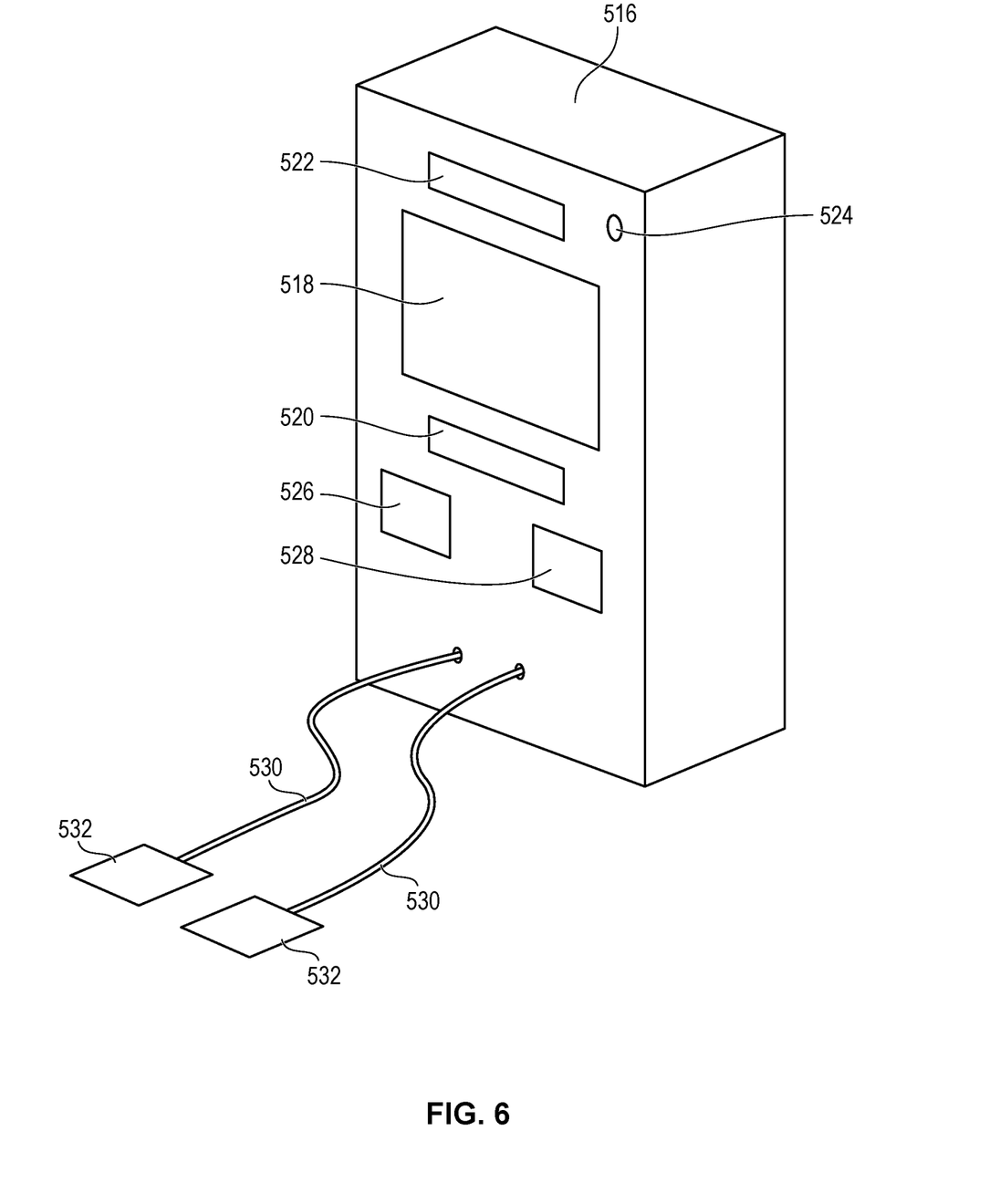
FIG. 6 is a schematic perspective view of a control and communication unit providing various functions for UAVs.

A control and communication unit 516 is provided, and shown in greater detail in FIG. 6. The control and communication unit 516 has an interface that will provide for two-way communication with the user. For this purpose, it may include a monitor screen 518 for displaying information, a keypad 520 for a user to input data or information, a loudspeaker 522 communicating with the user and a camera 524 for viewing user activities. The unit 516 may also include a credit card reader indicated schematically at 526 and a printer indicated at 528. The monitor by 18 may be in the form of a touchscreen, so a separate keypad 520 or other input device would not be required.

All or some of the functionality of the control and communication unit 516 may be provided externally of the location 500, so as to provide for a security check before a user is permitted to enter location 500. For example, an interface provided outside the location 500, which may be a keypad, can require a user to enter a previously approved username and password, before the lock 514 is opened. Additionally, in known manner two factor authentication can be provided, where a password or code is transmitted to an electronic device or phone of the user, and the user is then required to enter that password or code into the external interface, before obtaining access to the location 500. Alternatively, as shown, the entire control and communication unit 516 can be provided inside of the location 500, and a user may communicate wirelessly, e.g. from a smart phone, with the unit 516, to gain access to the location 500.

To enable charging of a UAV 102, charging cables 530 are provided, and as indicated include suitable connectors 532 for connection to a UAV 102. Two charging cables 530 are shown, as UAVs commonly have separate batteries, requiring separate charging, namely an avionics battery for avionics and control electronics, and a propulsion battery with a larger capacity, for supplying power required to propel the UAV. Thus, one charging cable 530 is for charging the avionics battery and the other charging cable 530 is for charging the propulsion battery. In the event that a UAV has a different number of batteries, then appropriate modifications to the charging arrangement can be made, e.g. providing more or fewer charging cables, each arranged to provide charge at a required voltage and current, which may be different between the different charging cables. Additionally, for use with a variety of different UAVs, the control and communication unit 516 can have an input, for inputting identifying information for a UAV 102 requiring charging, so that the voltage and current supplied to the charging cables 530 can be adjusted to parameters suitable for that UAV. UAV zones including charging cable(s) can be considered to be charging zones.

The cables 530 may be configured to require manual connection to the UAV. The cables and the connectors 532 may alternatively be configured to provide automatic connection to a UAV provided it lands within a specified area, so no human intervention is required.

A further aspect of the invention envisages providing one or both of a dedicated UAV, indicated at 540, and medical supplies, particularly emergency medical supplies, indicated schematically at 542. The UAV 540 and medical supplies 542 are shown located at a separate location 500a. As required, this may have the same functionality as the location 500, or alternatively it may be provided just with functions necessary for the UAV 540. As shown, the location 500a may not need any enclosure or access door. A location or zone provided with at least one of the UAV 540 and medical supplies 542 can be considered to be a medical supply location.

The UAV 540 is stored and housed in the housing 544. Where the location 500 is generally open and exposed, the housing 544 may be configured to protect the UAV 540 from the elements, as it is envisaged that the UAV 540 may be used only occasionally and will therefore be in storage for considerable periods of time. The housing 544 is provided with a communications module 546, for communicating the status of the UAV 540, and in particular the status of the state of charge of batteries of the UAV 540 and/or the status of medical supplies 542 associated with the UAV. The communications module 546 may be equivalent to the control panel 116 described for other embodiments. For example, many medical supplies may have a limited life, and it may be desirable to ensure that available supplies 542 have not expired before the art dispatched for use.

UAVs are commonly only able to maneuver once they have lifted off vertically from a rest or storage position, the housing 544 may have a top or closure 548, in the form of a lid or roof, that may be opened remotely, to permit the UAV 540 to leave the housing 544, without requiring manual intervention. The closure 548 is connected to the communications module 546, for operation thereof, and will serve to protect the UAV. The closure 548 may be in the form of any of the embodiments shown in FIG. 7.

Similarly to the communication unit 516, charging cables 550 are provided connected to the UAV 540, for maintaining avionics and propulsion batteries in a charged state to enable remote operation, again without requiring manual intervention, connections to the charging cables 550 should be such as to enable the UAV 540 to disconnect from the cables 550, by simply rising vertically.

When it is required to deploy the UAV 540 and its medical supplies 542, a signal can be sent via the communication module 546, to open the closure 548. The UAV 540 is then provided with instructions to carry out a mission to deliver the medical supplies 542, and commences the mission by lifting off vertically out of the housing 544, disconnecting from the cables 550.

As indicated, the flight control system 150 is in communication with various components of the location 500 and the UAV 540. Communication is achieved through a network indicated schematically at 580. The control and communication unit 516, the communications module 546, the remotely operable lock 514 and the UAV 540 are all in communication with the network 580, to receive commands from and to supply data to, as required, the flight management system 150. As detailed below, the flight management system may monitor remotely the status of batteries of the UAV 540 and/or medical supplies 542.

While the medical supplies 542 are shown attached to a dedicated UAV 540, in an alternative embodiment medical supplies 542 can be stored separately from the UAV. The medical supplies 542 may then be provided with attachment fittings for attachment to a suitable UAV, or the medical supplies may be otherwise carried by a UAV. In this case, the housing 544 would then be used solely to house the medical supplies 542. When it is required to deploy the supplies 542, the closure 548 would be opened, to permit a selected UAV to land and engage, or otherwise pick up the medical supplies 542. With the medical supplies 542 engaged, the UAV can then transport the supplies 542 to a desired location.

The status of the medical supplies 542 may be monitored in a variety of ways. The flight management system 150 may simply keep a record of the medical supplies 542 at different locations, with information on age, expiry dates and related information. However, this does leave the medical supplies 542 open to tampering or being exchanged for different supplies. Alternatively, the communications module 546 may be provided with means for communicating with the medical supplies 542, at least to gather basic information on age, expiry date etc. This purpose, the medical supplies 542 may be provided with barcodes or the like, which are presented so as to be readable by the communications module 546. Alternatively, medical supplies 542 may be provided with electronic communication with the communications module 546.

Other parameters that may affect the status of the medical supplies 542 may be monitored by the housing 544 and the communications module 546. For example, temperature and humidity parameters may be recorded, as some medical supplies may be adversely when subject to extremes of heat and humidity and data on temperature and humidity may be communicated to the flight control system 150.

Additionally, where a UAV 540 is maintained and stored for a period of time, specifically to deliver medical supplies, the state of charge of the batteries of the UAV can be monitored remotely by the flight management system 150, so that when a request is made to deploy the UAV 540, the flight management system can first check and confirm that it is charged and ready for deployment.

It is envisaged that a plurality of the locations 100, 300, 500 will be provided, located so as to provide convenient access to users, and spaced to meet the needs of users and to correspond with the capabilities of UAVs. it may only be necessary to provide for medical supplies 542 and a UAV 540 to be stored and made available at selected ones of the locations, chosen to provide adequate coverage and availability for the medical supplies within a defined geographic area, i.e. to ensure that anywhere within that geographic area is within the flying range of a UAV transporting the medical supplies. Further, for the medical supplies 542, they could be located at specialized locations, such as at a hospital, medical facility or doctor's offices. Such a specialized location may be provided only for the delivery of medical supplies, and not for general-purpose use as a location for UAVs to transport any type of article. Such a specialized location may be used for other medical related functions, e.g. receipt and delivery of non-emergency medical supplies to a hospital or medical facility. Locating the medical supplies at a specialized facility should also facilitate monitoring the medical supplies, ensuring that they have not expired and replacing them as necessary.

It is anticipated that, for conventional (i.e. not emergency medical) articles, a UAV will deliver such articles between two of the locations 100, 300, 500. For emergency medical supplies 542, delivery may be effected to another of the locations 100, 300, 500. In particular, it may be that the emergency medical supplies will be required at a location associated with a hospital, medical facility or the like. On the other hand, often it is expected that the emergency medical supplies will be required and will be delivered to the scene of an accident, remote for any location for UAV as described.

While the various locations 100, 300, 500 above have been described, generally, as being open at the top, to enable UAVs to land and takeoff, for many purposes and applications it may be desirable to provide enclosed locations, which will serve to protect UAVs and goods or packages transported by UAVs from the weather and surrounding environment. For this purpose, FIG. 7 shows a number of alternative arrangements or embodiments for providing a fully enclosed location, any one of which can be applied to locations described above, and also to a dedicated UAV 540 provided with medical supplies 542.

Figure 7:
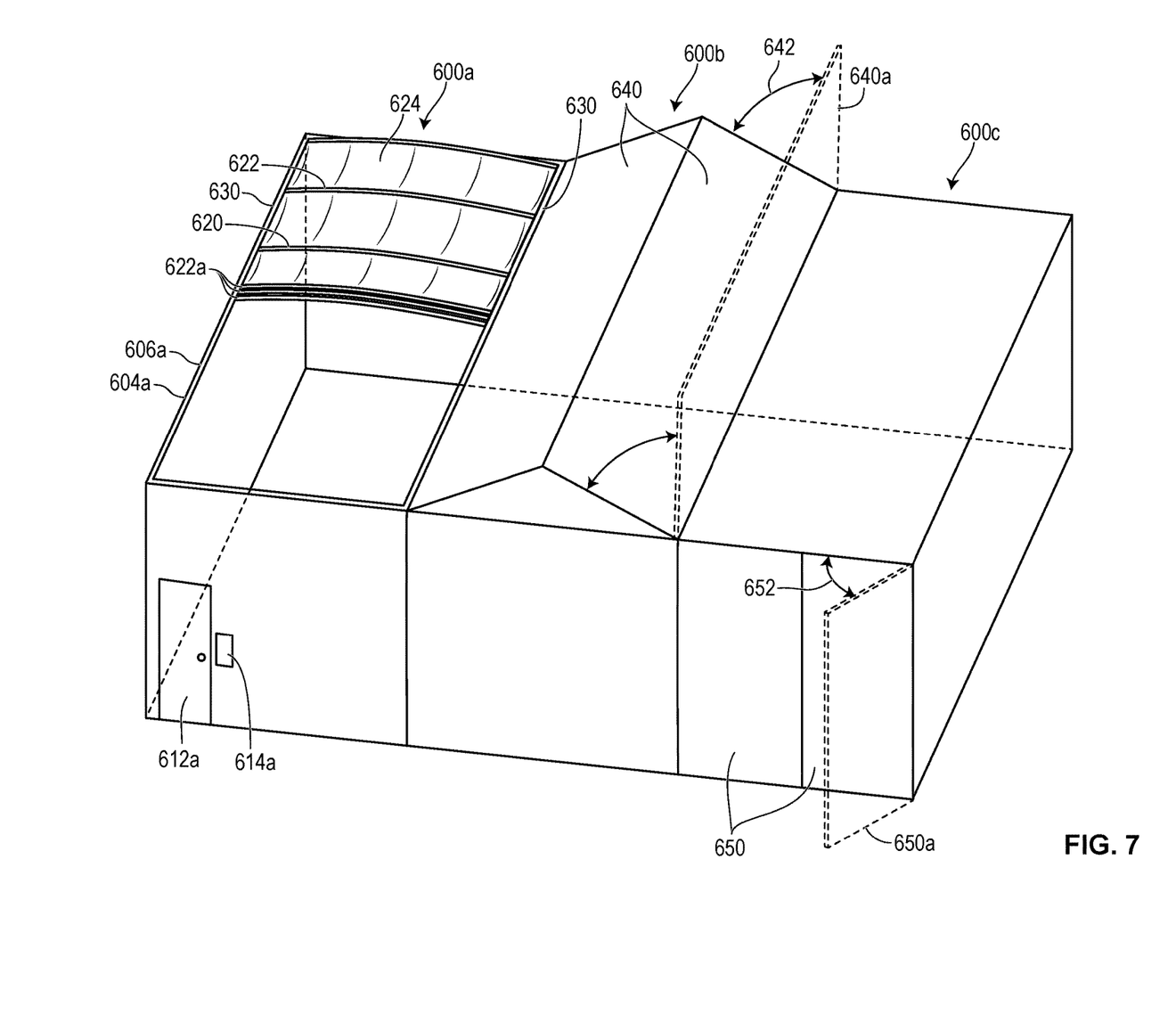
FIG. 7 shows schematic examples of other embodiments of a location for UAV landing and taking off.

FIG. 7 shows three separate locations indicated at 600a, 600b and 600c. For each of these locations 600a, 600b, 600c, the features described above for other locations may be incorporated. For example, as shown for the location 600a, a barrier 604a serves to define an enclosure 606a. A door, gate or other closure 612a provides for access to the enclosure 606a and may be secured with a lock 614a. While not shown, the other locations 600b and 600c can be similarly equipped.

The location 600a is provided with a covering or roof 620 in the form of a sliding or rolling tarpaulin system. A plurality of crossmembers 622 extend across and between sidewalls 630. In known manner, the crossmembers 622 are provided with rollers or other mechanisms for sliding movement along the tops of the sidewalls 630. Again, in known manner, cable or other drive systems can be provided along the top edges of the sidewalls 634, for moving the crossmembers 622. The crossmembers 622 are covered and connected by a tarpaulin or membrane generally indicated at 624. The drive mechanism is provided for moving the crossmembers 622 between an open and close configuration. As shown, the covering 620 is in a partially open position, where crossmembers 622 at the top of FIG. 7 are spaced apart with the tarpaulin 624 covering the location. Three crossmembers 622, as indicated at 622a are bunched close together, as occurs when the roof 620 is being open or closed.

In the middle of FIG. 7, the location 600b is in the form of a conventional pitched roof, comprising two roofing panels 640, which meet at the top to form a ridge. As indicated by an arrow 642 for one of the panels 640, this can be pivoted upwards to the vertical position, and the other panel 640 can simply be moved to a vertical position, to completely open the location 600*b*, to enable UAVs to land and to takeoff.

On the right-hand side of FIG. 7, the location 600*c* shows a further alternative, which recognizes that UAVs can travel horizontally. Provided the location has sufficient headroom, then a UAV can enter and leave the location in a horizontal direction. For this purpose, the location 600*c* simply has a pair of doors 650, which in known manner can be opened to provide full access to the interior of the location 600*c*. As indicated by the arrow 652 for one of the doors 650, this would move outwardly to a position indicated at 650*a*, and the other door would open in a similar manner. Alternatively, the doors may open inwardly.

The medical supplies may be in accordance with those disclosed in applicant's co-pending U.S. application Ser. Nos. 15/796,210 and 15/796,252, both filed Oct. 27, 2017. Full contents of both those applications are incorporated by reference A controlled access UAV zone or location as disclosed can be provided at a variety of different places. For example, a drone delivery service operator may provide a UAV parking zone or location at customers' premise, for each customer who regularly uses the drone delivery service. The customers could be, for example, manufacturers, shippers, distributors or other businesses. The controlled access UAV zone or location may also be provided at any suitable public location or building. E.g., in smaller communities, it could be provided at a school, hospital, town hall, public library, court house, shopping mall, etc., and may be a building or facility that is government owned and operated or one that is privately owned and operated, such as a shopping mall. A controlled access UAV location may also be provided at a multi-tenanted building, such as a condominium. For any building, including mid to high rise multi-occupant buildings, it may be preferable to place the UAV location on the roof or other high point of the building.

In another aspect, a UAV parking zone or location could be provided for use by several customers of drone delivery service. For example, a common UAV parking zone or location can be provided at an industrial mall, where there are a number of businesses. In such a case, each business may be provided with an access code.

In some embodiments and depending on the UAV parking zone or location and the businesses, a common access code for accessing the UAV parking zone or location may be provided to the businesses. In other embodiments, each business may be provided with a dedicated access code. Dedicated access codes may provide for, for example, tracking access to the UAV parking zone or location, and setting up varying permission levels. The permission levels may include, for example, for each dedicated access code one or more time slots during which the access code may provide access to a given UAV parking zone or location. Each individual access code may be made active, only when a UAV is arriving or leaving with a delivery for that business.

In yet another aspect, a pay structure may be assigned to dedicated access codes. Alternatively or as well, the pay structure could vary depending on time, e.g. time slots outside of regular business hours could be less expensive than time slots in regular business hours. In some examples, one or more permission levels may be assigned to a given dedicated access code depending on the terms of an agreement under which the code may be licensed or leased to a customer. In a particular example, a customer access system may be provided using at least one computing system. The access system may be operable to provide a pay structure for dedicated access codes. For example, a year may be broken down into weeks, days, and possibly hours.

The resulting time slots, days, and weeks may each be associated, either individually or in groups, with varying levels of demand for a drone delivery service at a given UAV parking zone or location. Accordingly, the system may be operable to sell, lease, or rent out dedicated access codes depending on the access or permission level(s) requested by a customer for each of the access codes.

For example, the customer access system may be operable to assign to a given dedicated access code, permissions for that code to provide access to a given UAV parking zone or location on certain days, e.g. Mondays, Wednesdays, and Fridays, and may be operable to assign a given sale, lease, or rent rate or value (for example, expressed in dollars) to that code, or type of code. The system may be further operable to assign different permissions and lease, or rent rate or value to different dedicated access codes or types or classes of dedicated access codes.

In a further aspect, the customer access system may be operable to assign different limits for at least one of UAV landings and take-offs, and corresponding pricing, for different dedicated access codes, dedicated access code types, or dedicated access code classes. For example, the customer access system may be operable to sell dedicated access codes on at least one of a per-UAV-landing and a per-UAV-take-off basis. That is, the system may assign a given price for each UAV landing and each UAV take-off, the pricing may vary depending on time, location and other factors, and may also provide discounts where, for example, a minimum number or numbers of landings and take-offs are purchased by a customer.

In yet a further aspect, the system may assign a dedicated access code to a given customer, and may be operable to request "re-fills" of landings and take-offs when the customer uses all pre-purchased landings and take-offs at the UAV parking zone or location to which that code may be assigned. In another aspect, the system may be operable to track the number of landings and take-offs used by each customer and may be operable to bill each customer based on the number and based on, for example, a payment method chosen by each customer. In one example, a customer may provide at least one of a credit card and a debit card and authorization to charge the card(s) on, for example, a weekly or a monthly basis.

Other aspects are described next. In one aspect, if one of the businesses at the example industrial mall, a customer of the drone delivery service, is either sending an article or expecting delivery of an article by the drone delivery service, only that customer's access code may permit access to the UAV zone or location while this delivery operation is taking place.

For a package to be sent from the UAV zone or location, access to the location may be restricted to that customer, until the UAV has picked up the article and departed from the UAV zone or location. At that time, the UAV zone or location may be released for use by another customer. Similarly, while the UAV is delivering an article to one customer, access may be restricted to that one customer, until at least the customer has accessed the UAV zone or location and retrieved the delivered article.

A UAV zone or location as disclosed can be provided in a variety of different places. It can be provided simply on any suitable flat, unobstructed piece of ground. Alternatively, and for an example in a more crowded or industrial setting, the UAV zone or location may be provided on top of a building with a flat roof, or a building on which a large enough flat landing and take-off area can be constructed. An advantage of providing a UAV zone or location on top of a building may be that it may reduce the requirement for a UAV to fly down between obstructions such as poles, power cables, other buildings, and the like and may reduce the possibility for accidents. A rooftop location also inherently limits access, and it may not be necessary to provide a barrier around such a location for security purposes; a barrier may still be desirable for safety purposes, e.g., around the edge of a flat rooftop.

In addition to locations identified above, a UAV location as disclosed can be provided at warehouses, distribution centers, cross-docking facilities, order fulfillment facilities, packaging facilities, shipping facilities, rental facilities, libraries, retail stores, wholesale stores, museums, or other facilities or combinations thereof.

In a variant embodiment, a simplified UAV zone or location may be provided. This may be suitable for a location that receives low traffic volumes and/or may be temporary, so that the cost of the fully equipped zone or location is not justified.

A simplified UAV zone may include just some form of an enclosure or barrier to control access to the zone. As for other zones locations, it may include an access door or gate, with a lock, and the lock may be controlled remotely by a flight management system. The zone or location could be provided anywhere, and the interior or base may be left unfinished, i.e. it would not be finished or equipped for the landing of a UAV.

Then, to enable a package to be delivered, the following sequence may be effected:
(a) the zone or location will be secured, and a flight management system may check to ensure that an access to the zone is closed and locked;
(b) to deliver a package to the zone or location, a UAV would travel to the zone;
(c) on arriving at the zone, the UAV would simply hover over the zone or location, and then drop the package from a predetermined height, e.g. 5, 10, 15, 20 or 25 feet;
(d) once the package has been dropped, the UAV can depart, without having to land at the zone or location, and may optionally transmit a signal to indicate that the package has been delivered and dropped;
(e) on receipt of the signal from the UAV, the flight management system can then release the lock on the door or gate, to enable access to the zone or location by ground personnel, to retrieve the package;
(f) optionally, instead of or as well as relying on a signal from the UAV, the zone or location can be provided with sensors to detect that a package has been dropped into the zone or location, to enable the lock to be opened and a notification of the package delivery to be sent to an intended recipient, for the recipient to pick up the package; and
(g) also optionally, the zone or location may be provided with various devices to cushion a dropped package, for example a net could be strung up within the zone or location, or foam padding or the like may be provided.

To enable a UAV to navigate accurately to such a simplified zone or location, a homing beacon may be provided at the zone or location, so that the UAV, at the end of its flight route, can simply home in on the beacon. It may also be possible to use an electronic device carried by a user. For example, at a temporary or other location, a user may first access the location and then leave a smart phone or other electronic device that transmits positional information, in the location. The user then exits the location, secures unlocks the location, as checked and confirmed by a flight management system, so that the UAV may deliver a package. The UAV then homes in on the smart phone or other electronic device, to ensure that the package is delivered at the correct location.

It will be understood that such a simplified UAV zone or location is intended primarily for delivery of the package, without the UAV landing. It may be possible for a UAV to pick up a package, if the package is provided with some form of a tether or hook that the UAV can engage, without the UAV landing.

While the UAV shown is a multirotor helicopter, a UAV location can be configured for any type of UAV, including multirotor helicopters, such as a quadcopter or a fixed wing craft. For example, the UAV may include a combination of both propellers and fixed wings. For example, the UAV may utilize one or more propellers to enable take-off and landing and a fixed wing configuration or a combination wing and propeller configuration to sustain flight while the UAV is airborne. A UAV location for UAVs not adapted for vertical landing and take-off will be configured to provide suitable flight paths for landing and take-off.

A UAV for use with the UAV location disclosed can include any instrumentation suitable for assisting in the control of the UAV, including a time of flight sensor or calculator, radar, sonar, a camera, an infrared sensor, one or more displays, image capture devices, thermal sensors, accelerometers, pressure sensors, weather sensors, LIDAR, sensors for detecting hazardous materials, etc.

Further, while the invention has been described for use with aerial vehicles, it may be applied to land vehicles, such as robots or autonomously guided vehicles as cars, the travel along road systems.

The apparatuses, systems, functions, and methods described in this document may be implemented using any combination of suitable known technology, materials, and manufacturing, assembly, and programming methods.

A number of embodiments have been described herein. However, it will be understood by persons skilled in the art that other variants and modifications may be made without departing from the scope of the embodiments as defined in the claims appended hereto. A person skilled in the art will also recognize that the embodiments described above should be read as representative of a plethora of permutations not explicitly described, the permutations incorporating elements from various embodiments.

The invention claimed is:

1. An unmanned aerial vehicle (UAV) system, comprising:
a controlled access UAV zone, the UAV zone being for at least one of: UAV landing, UAV loading, and UAV take-off, that is accessible by a UAV;
a control panel at the controlled access UAV zone;
a barrier around the UAV zone to enclose the UAV zone and to control entry into the UAV zone by personnel, an opening in the barrier to permit personnel to enter into the UAV zone, a closure for the opening, and at least one remotely operable lock for the closure;
the control panel being configured to store a plurality of access codes for the UAV zone, wherein at least some of the access codes are assigned different levels of permissions based on a predetermined factor, and wherein the plurality of access codes can be updated by a flight management system remote from the control panel; and the control panel being operable to control the lock for that UAV zone to govern access to and entry into that UAV zone by personnel based on the dedicated access codes.

2. The UAV system of claim 1, wherein the different levels of permissions may include restrictions on time of day during which the UAV zone is accessible, dates on which the UAV zone is accessible, days of week during which the UAV zone is accessible, and areas within the UAV zone that are accessible.

3. The UAV system of claim 1, wherein some or all of the dedicated access codes belong to a class, the class sharing the same level of permissions.

4. The UAV system of claim 1, wherein the system is operable to assign a permission to an access code based on a request from a user of the access code.

5. The UAV system of claim 1, wherein the predetermined factor used to determine the levels of permissions for each of the at least some dedicated access codes consists of number of UAV landings corresponding to that UAV zone, number of UAV takeoffs corresponding to that UAV zone, pay structure associated with the UAV zone, contractual agreements associated with the UAV zone and frequency of desired use of the UAV zone.

6. The UAV system of claim 5, wherein the pay structure is varied depending on the time of day.

7. The UAV system of claim 1, wherein a first access code is made active only when the UAV is landing at the UAV zone with a delivery for a first user of the first access code.

8. The UAV system of claim 7, wherein all access codes stored at the control panel are deactivated except for the first access code until the first user has accessed the UAV.

9. The UAV system of claim 1, wherein a first access code is made active only when the UAV is taking off from the UAV zone with a delivery sent by a first user of the access code.

10. The UAV system of claim 9, wherein all access codes stored at the control panel are deactivated except for the first access code until the UAV has taken off.

11. A method of controlling access to a location for unmanned aerial vehicles (UAVs), the method comprising:
providing, for the location, an enclosure defined by a barrier to personnel, the enclosure including at least one zone for landing and take-off of a UAV and accessible by a UAV;
providing, for the location, a control panel at the zone;
providing, for the location, an opening in the barrier to permit personnel to enter the enclosure and a closure for closing the opening;
providing, for the location, a remotely actuatable lock for the closure;
storing, at the control panel, a plurality of access codes for the UAV zone, wherein at least some of the access codes are assigned different levels of permissions based on a predetermined factor, and wherein the plurality of access codes can be updated by a flight management system remote from the control panel; and
actuating the lock for each location based on the access codes, to permit opening of the closure thereof, thereby to enable users of the access codes to enter that enclosure.

12. The method of claim 11, wherein the different levels of permissions may include restrictions on time of day during which the UAV zone is accessible, dates on which the UAV zone is accessible, days of week during which the UAV zone is accessible, and areas within the UAV zone that are accessible.

13. The method of claim 11, wherein some or all of the dedicated access codes belong to a class, the class sharing the same level of permissions.

14. The method of claim 11, wherein the method further comprises assigning a permission to an access code based on a request from a user of the access code.

15. The method of claim 11, wherein the predetermined factor used to determine the levels of permissions for each of the at least some dedicated access codes consists of number of UAV landings corresponding to that UAV zone, number of UAV takeoffs corresponding to that UAV zone, pay structure associated with the UAV zone, contractual agreements associated with the UAV zone and frequency of desired use of the UAV zone.

16. The method of claim 15, wherein the pay structure is varied depending on the time of day.

17. The method of claim 11, wherein a first access code is made active only when the UAV is landing at the UAV zone with a delivery for a first user of the first access code.

18. The method of claim 17, wherein all access codes stored at the control panel are deactivated except for the first access code until the first user has accessed the UAV.

19. The method of claim 11, wherein a first access code is made active only when the UAV is taking off from the UAV zone with a delivery sent by a first user of the access code.

20. The method of claim 19, wherein all access codes stored at the control panel are deactivated except for the first access code until the UAV has taken off.

* * * * *